United States Patent
Massari et al.

(10) Patent No.: US 11,028,259 B2
(45) Date of Patent: *Jun. 8, 2021

(54) MULTILAYER FILM COMPRISING PROPYLENE-ETHYLENE-1-BUTENE TERPOLYMERS

(71) Applicant: BASELL POLIOLEFINE ITALIA S.R.L., Milan (IT)

(72) Inventors: Paola Massari, Ferrara (IT); Caroline Cathelin, Ferrara (IT); Claudio Cavalieri, Ferrara (IT); Marco Ciarafoni, Ferrara (IT); Andrea Felisati, Ferrara (IT); Angelo Ferraro, Ferrara (IT); Giampiero Morini, Ferrara (IT); Fabrizio Piemontesi, Ferrara (IT); Gianni Vitale, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 89 days.

This patent is subject to a terminal disclaimer.

(21) Appl. No.: 15/750,799

(22) PCT Filed: Jul. 19, 2016

(86) PCT No.: PCT/EP2016/067143
§ 371 (c)(1),
(2) Date: Feb. 6, 2018

(87) PCT Pub. No.: WO2017/021137
PCT Pub. Date: Feb. 9, 2017

(65) Prior Publication Data
US 2018/0223084 A1 Aug. 9, 2018

(30) Foreign Application Priority Data

Aug. 6, 2015 (EP) ..................................... 15180036

(51) Int. Cl.
*C08L 23/14* (2006.01)
*B32B 27/32* (2006.01)
*B32B 27/08* (2006.01)

(52) U.S. Cl.
CPC ............ *C08L 23/142* (2013.01); *B32B 27/08* (2013.01); *B32B 27/32* (2013.01); *C08L 23/14* (2013.01);
(Continued)

(58) Field of Classification Search
CPC .... C08L 23/142; C08L 23/14; C08L 2201/10; C08L 2203/162; C08L 2308/00;
(Continued)

(56) References Cited

U.S. PATENT DOCUMENTS

| 4,237,254 A | 12/1980 | Kitagawa et al. |
| 5,623,021 A * | 4/1997 | Pelliconi ................. C08F 10/00 525/240 |

(Continued)

FOREIGN PATENT DOCUMENTS

| EP | 0203727 A2 | 12/1986 |
| EP | 0674991 A1 | 10/1995 |

(Continued)

OTHER PUBLICATIONS

International Search Report and Written Opinion dated Sep. 23, 2016 (Sep. 23, 2016) for Corresponding PCT/EP2016/067143.

*Primary Examiner* — Samir Shah (57) ABSTRACT

A multilayer film made from or containing a skin layer made from or containing a polyolefin composition made from or containing:
A) from 19 wt % to 50 wt % of a propylene ethylene copolymer having an ethylene derived units content ranging from 1.5 wt % to 6.0 wt % and
B) from 50 wt % to 81 wt % of a propylene ethylene 1-butene terpolymer having an ethylene derived units con-
(Continued)

tent ranging from 1.5 wt % to 6.0 wt % and 1-butene derived units content of between 4.8 wt % to 12.4 wt %;
the sum of the amount of component A) and B) being 100;
the composition being characterized by the following features:
- molecular weight distribution (MWD), expressed in terms of $M_w/M_n$, greater than 4.0;
- the creep and recovery curve measured on the polymer fuse at 200° C. shows a maximum value between 600 and 1200 seconds, lower than $53 \times 10^{-5}$ 1/Pa.

12 Claims, 1 Drawing Sheet

(52) U.S. Cl.
CPC ..... *B32B 2250/242* (2013.01); *B32B 2250/40* (2013.01); *B32B 2307/412* (2013.01); *B32B 2307/414* (2013.01); *B32B 2307/548* (2013.01); *B32B 2307/732* (2013.01); *B32B 2307/75* (2013.01); *C08L 2201/10* (2013.01); *C08L 2203/162* (2013.01); *C08L 2205/025* (2013.01); *C08L 2308/00* (2013.01)

(58) Field of Classification Search
CPC ... C08L 2205/025; B32B 27/08; B32B 27/32; B32B 2307/75; B32B 2250/40; B32B 2250/242; B32B 2307/412; B32B 2307/548

See application file for complete search history.

(56) References Cited

U.S. PATENT DOCUMENTS

| | | |
|---|---|---|
| 2005/0142367 A1 | 6/2005 | Su et al. |
| 2005/0192178 A1 | 9/2005 | Takaoki |
| 2009/0305069 A1 | 12/2009 | Goeldel et al. |
| 2016/0121580 A1* | 5/2016 | Grazzi ............... B32B 7/12 428/516 |

FOREIGN PATENT DOCUMENTS

| | | |
|---|---|---|
| EP | 1243612 A2 | 9/2002 |
| EP | 2666793 A1 | 11/2013 |
| EP | 2743307 A1 | 6/2014 |
| EP | 2810773 A1 | 12/2014 |
| JP | S5490382 A | 7/1979 |
| JP | S5494591 A | 7/1979 |
| JP | 2004162025 A | 6/2004 |
| JP | 2008536720 A | 9/2008 |

* cited by examiner

MULTILAYER FILM COMPRISING PROPYLENE-ETHYLENE-1-BUTENE TERPOLYMERS

This application is the U.S. National Phase of PCT International Application PCT/EP2016/067143, filed Jul. 19, 2016, claiming benefit of priority to European Patent Application No. 15180036.4, filed Aug. 6, 2015, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to multilayer films made from or containing a polyolefin composition made from or containing a propylene/ethylene copolymer and a propylene/ethylene/1-butene terpolymers,

BACKGROUND OF THE INVENTION

Propylene copolymers or terpolymers are useful for making films.

Propylene copolymers or terpolymers have better impact, lower rigidity and better transparency than propylene homopolymers. In some cases, finding an acceptable balance between these properties is difficult.

SUMMARY OF THE INVENTION

In a general embodiment, the present disclosure provides a multilayer film made from or containing a skin layer made from or containing a polyolefin composition made from or containing a propylene/ethylene copolymer and a propylene/ethylene/1-butene terpolymers.

In a general embodiment, the present disclosure provides a multilayer film made from or containing a skin layer made from or containing a polyolefin composition made from or containing:

A) from about 19 wt % to about 50 wt %, based upon the total weight of the polyolefin composition, of a propylene ethylene copolymer having an ethylene derived units content ranging from about 1.5 wt % to about 6.0 wt %, based upon the total weight of the propylene ethylene copolymer and B) from about 50 wt % to about 81 wt %, based upon the total weight of the polyolefin composition, of a propylene ethylene 1-butene terpolymer having an ethylene derived units content ranging from about 1.5 wt % to about 6.0 wt %, based upon the total weight of the propylene ethylene 1-butene terpolymer, and 1-butene derived units content of between about 4.8 wt % and about 12.4 wt %, based upon the total weight of the propylene ethylene 1-butene terpolymer;

the sum of the amount of component A) and B) being 100;
the composition being characterized by the following features:

molecular weight distribution (MWD), expressed in terms of Mw/Mn, greater than about 4.0;

the creep and recovery curve measured on the polymer fuse at 200° C. shows a maximum value between 600 and 1200 seconds, lower than about $53 \times 10^{-4}$ 1/Pa.

BRIEF DESCRIPTION OF THE DRAWINGS

The claimed subject matter may be understood by reference to the following description taken in conjunction with the accompanying FIGURE, in which

DETAILED DESCRIPTION OF THE INVENTION

Figure 1:
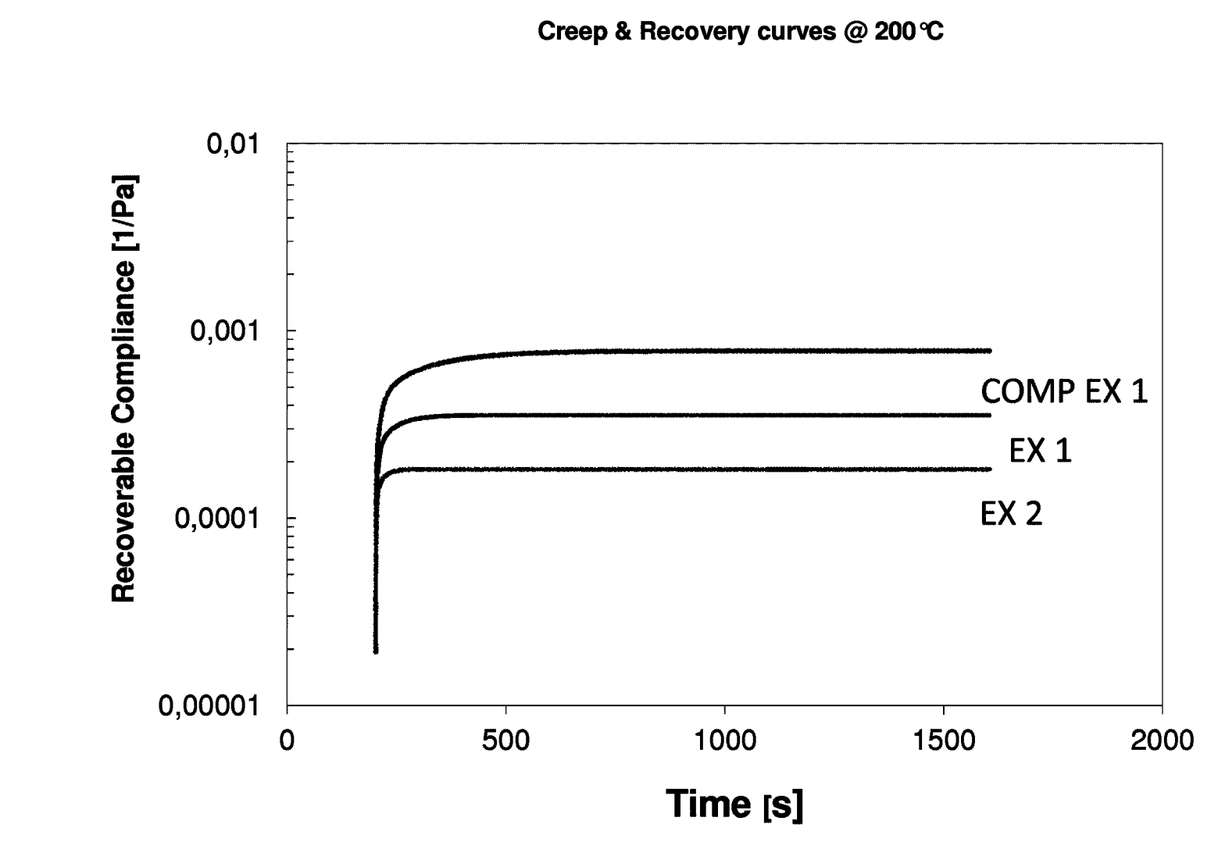
FIG. 1 represents the creep and recovery curve measured on the polymer fuse at 200° C. of Examples 1 and 2 and Comparative Example 1.

In a general embodiment, the present disclosure provides a multilayer film made from or containing a skin layer made from or containing a polyolefin composition made from or containing:

A) from about 19 wt % to about 50 wt %, alternatively from about 25 wt % to about 42 wt %; alternatively from about 31 wt % to about 38 wt %, based upon the total weight of the polyolefin composition, of a propylene ethylene copolymer having an ethylene derived units content ranging from about 1.5 wt % to about 6.0 wt %; alternatively from about 2.6 wt % to about 5.2 wt %, alternatively from about 3.1 wt % to about 4.3 wt %, based upon the total weight of the propylene ethylene copolymer;

B) from about 50 wt % to about 81 wt %, alternatively from about 58 wt % to about 75 wt %; alternatively from about 62 wt % to about 69 wt %, based upon the total weight of the polyolefin composition, of a propylene ethylene 1-butene terpolymer having an ethylene derived units content ranging from about 1.5 wt % to about 6.0 wt %; alternatively from about 1.9 wt % to about 4.8 wt %; alternatively from about 2.1 wt % to about 3.7 wt %, based upon the total weight of the propylene ethylene 1-butene terpolymer, and 1-butene derived units content between about 4.8 wt % and about 12.4 wt %; alternatively from about 5.1 wt % to about 10.3 wt %; alternatively from about 6.8 wt % to about 9.5 wt %, based upon the total weight of the propylene ethylene 1-butene terpolymer;

the sum of the amount of component A) and B) being 100;
the polyolefin composition being characterized by the following features:

molecular weight distribution (MWD), expressed in terms of Mw/Mn, greater than about 4.0; alternatively greater than about 4.5; alternatively greater than about 4.7;

the creep and recovery curve measured on the polymer fuse at 200° C. shows a maximum value between 600 and 1200 seconds, lower than about $53 \times 10^{-5}$ 1/Pa; alternatively lower than about $51 \times 10^{-5}$ 1/Pa, alternatively lower than about $45 \times 10^{-5}$ 1/Pa.

In some embodiments, in the polyolefin composition the ethylene derived units content ranges from about 1.5 wt % to about 6.0 wt %; alternatively ranges from about 2.1 wt % to about 5.2 wt %; alternatively ranges from about 2.5 wt % to about 4.3 wt %; alternatively ranges from about 2.8 wt % to about 3.9 wt %, based upon the total weight of the polyolefin composition.

In some embodiments, in the polyolefin composition the 1-butene derived units content ranges from about 3.2 wt % to about 9.8 wt %; alternatively ranges from about 3.6 wt % to about 8.2 wt %; alternatively ranges from about 4.8 wt % to about 7.9 wt %; alternatively ranges from about 5.8 wt % to about 7.4 wt %, based upon the total weight of the polyolefin composition.

In the present description, the term "propylene ethylene 1-butene terpolymer" as used herein refers to a polymer containing propylene, ethylene and 1-butene comonomers. In the present description, the term "propylene ethylene copolymer" as used herein refers to a polymer containing propylene and ethylene as comonomers.

In some embodiments, the melt Flow Rate (MFR 230° C. 2.16 kg) of the polyolefin composition, as a reactor grade, ranges from about 0.9 to about 25 g/10 min, alternatively from about 3.0 to about 20.0 g/10 min; alternatively from about 4.0 to about 18.0 g/10 min. In the present description, the term "reactor grade" as used herein refers to a polyolefin composition that has not been subjected to chemical or physical visbreaking.

In some embodiments, the multilayer films is made from or contains a skin layer made from or containing the polyolefin composition made from or containing component A) and component B) while the remaining layers are formed of the same or other materials useful in multilayer films or film-coated products. In some embodiments, each layer is formed of a polypropylene homopolymer or copolymer or polyethylene homopolymer or copolymer or other kind of polymers such as EVA, EVOH.

The combination and number of the layers of the multilayer structure is not limited. In some embodiments, the number of layers is from 3 to 11 layers, alternatively from 3 to 9 layers, alternatively from 3 to 7 layers, and alternatively from 3 to 5 layers. In some embodiments, combinations include A/B/A, A/B/C, AB/CB/A, and A/B/C/D/C/B/A, including a skin layer A made from or containing the polyolefin composition.

In some embodiments, the layers of the multilayer film are 3 or 5 wherein a skin layer is made from or contains the polyolefin composition. In some embodiments, the structure is A/B/A or A/B/C wherein A is the polyolefin composition.

In the present description, the term "skin layer" as used herein refers to the top layer and/or the bottom layer of a multilayer film.

In some embodiments, in the multilayer film the top and the bottom layer of the film is made from or contains the polyolefin composition.

The multilayer film obtained with the polyolefin composition have a low seal initiation temperature (SIT) together with a low xylene solubles measured at 0/25° C.

In some embodiments, the polyolefin composition has:
the content of xylene soluble fraction at 0/25° C. (XS) between about 1.2 wt % and about 15.1 wt %, based upon the total weight of the polyolefin composition.
the seal initiation temperature (SIT) between about 90° C. and about 110° C.; In some embodiments, the xylene soluble fraction at 25° C. and the seal initiation temperature (SIT) fulfill the following relation $SIT<114-(XS\times1.3)$ where:
XS=% by weight of the fraction soluble in xylene at 0/25° C., based upon the total weight of the polyolefin composition;
SIT=° C. is the seal initiation temperature (SIT).
In some embodiments, the relation is:

$SIT<113-(XS\times1.3)$;

In some embodiments, the difference between the melting point and the SIT is higher than about 25° C.; alternatively higher than about 26° C.

In some embodiments, the polyolefin composition is prepared by a process including polymerizing propylene with ethylene in a first stage and then propylene with ethylene and 1-butene, in a second stage in the presence of a catalyst made from or containing the product of the reaction between:
(i) a solid catalyst component made from or containing Ti, Mg, Cl, and an electron donor compound, containing from about 0.1 to about 50% wt of Bi, based upon the total weight of the solid catalyst component;
(ii) an alkylaluminum compound and,
(iii) an electron-donor compound (external donor).

In some embodiments, in the catalyst component the content of Bi ranges from about 0.5 to about 40%, alternatively from about 1 to about 35, alternatively from about 2 to about 25% wt and alternatively from about 2 to about 20% wt, based upon the total weight of the solid catalyst component.

In some embodiments, the particles of solid component have substantially spherical morphology and average diameter ranging between about 5 and about 150 µm, alternatively from about 20 to about 100 µm, alternatively from about 30 to about 90 µm. In the present description, the term "substantially spherical morphology" as used herein refers to particles having the ratio between the greater axis and the smaller axis equal to or lower than about 1.5, alternatively lower than about 1.3.

In some embodiments, the amount of Mg ranges from about 8 to about 30%, alternatively from about 10 to about 25% wt, based upon the total weight of the solid catalyst component.

In some embodiments, the amount of Ti ranges from about 0.5 to about 5%, alternatively from about 0.7 to about 3% wt, based upon the total weight of the solid catalyst component.

In some embodiments, internal electron donor compounds are selected from alkyl and aryl esters of optionally substituted aromatic polycarboxylic acids such as esters of benzoic and phthalic acids, In some embodiments, the esters are selected from the group consisting of n-butylphthalate, di-isobutylphthalate, di-n-octylphthalate, ethyl-benzoate and p-ethoxy ethyl-benzoate.

In some embodiments, the Mg/Ti molar ratio is equal to, or higher than, about 13, alternatively in the range of about 14 to about 40, alternatively from about 15 to about 40. In some embodiments, the Mg/donor molar ratio is higher than about 16, alternatively higher than about 17 and alternatively from about 18 to about 50.

In some embodiments, Bi atoms derive from one or more Bi compounds not having Bi-carbon bonds. In some embodiments, the Bi compounds are selected from the group consisting of Bi halides, Bi carbonate, Bi acetate, Bi nitrate, Bi oxide, Bi sulphate, and Bi sulfide. In some embodiments, the Bi compounds are made from or contain Bi valence $3^+$.

In some embodiments, the Bi compound is selected from the group consisting of Bi trichloride and Bi tribromide. In some embodiments, the Bi compound is $BiCl_3$.

In some embodiments, the solid catalyst component is prepared by reacting a titanium compound of formula $Ti(OR)_{q-y}X_y$, where q is the valence of titanium and y is a number between 1 and q, with a magnesium chloride deriving from an adduct of formula $MgCl_2.pROH$, where p is a number between about 0.1 and about 6, alternatively from about 2 to about 3.5, and R is a hydrocarbon radical having 1-18 carbon atoms. In some embodiments, the titanium compound is $TiCl_4$. In some embodiments, the adduct is prepared in spherical form by mixing alcohol and magnesium chloride, operating under stirring conditions at the melting temperature of the adduct (100-130° C.). Then, the adduct is mixed with an inert hydrocarbon immiscible with the adduct thereby creating an emulsion which is quickly quenched causing the solidification of the adduct in form of spherical particles. In some embodiments, the procedure for the preparation of the spherical adducts are as disclosed in U.S. Pat. Nos. 4,399,054 and 4,469,648, incorporated herein by reference. In some embodiments, the adduct is reacted with Ti compound or subjected to thermal controlled dealcoholation (80-130° C.), thereby obtaining an adduct in which the number of moles of alcohol is lower than about 3, alternatively between about 0.1 and about 2.5. In some embodiments, the reaction with the Ti compound is carried out by suspending the adduct (dealcoholated or as such) in cold $TiCl_4$; the mixture is heated up to 80-130° C. and kept at this temperature for 0.5-2 hours. In some embodiments, the temperature of the cold $TiCl_4$ is about 0° C. In some embodiments, the treatment with $TiCl_4$ is carried out one or more times. In some embodiments, the electron donor compound is added during the treatment with $TiCl_4$.

In some embodiments, the Bi compound is incorporated directly into the $MgCl_2 \cdot pROH$ adduct during preparation of the adduct. In some embodiments, the Bi compound is added at the initial stage of adduct preparation by mixing the Bi compound together with $MgCl_2$ and the alcohol. Alternatively, the Bi compound is added to the molten adduct before the emulsification step. The amount of Bi introduced ranges from about 0.1 to about 1 mole per mole of Mg in the adduct. In some embodiments, the Bi compounds which are incorporated directly into the $MgCl_2 \cdot pROH$ adduct, are Bi halides. In some embodiments, the Bi compound is $BiCl_3$.

In some embodiments, the alkyl-Al compound (ii) is selected from the group consisting of trialkyl aluminum compounds. In some embodiments, the trialkyl aluminum compound is selected from the group consisting of triethylaluminum, triisobutylaluminum, tri-n-butylaluminum, tri-n-hexylaluminum, and tri-n-octylaluminum. In some embodiments, the alkylaluminum compound (ii) is selected from the group consisting of alkylaluminum halides, alkylaluminum hydrides and alkylaluminum sesquichlorides, optionally in mixture with the trialkyl aluminum compounds. In some embodiments, the alkylaluminum sesquichlorides are selected from the group consisting of $AlEt_2Cl$ and $Al_2Et_3Cl_3$. In some embodiments, the Al/Ti ratio is higher than about 1, alternatively between about 50 and about 2000.

In some embodiments, the external electron-donor compounds are selected from the group consisting of silicon compounds, ethers, esters, amines, heterocyclic compounds and ketones. In some embodiments, the external electron-donor compound is 2,2,6,6-tetramethylpiperidine.

In some embodiments, the external donor compounds are silicon compounds of formula $(R_6)_a(R_7)_bSi(OR_8)_c$, where a and b are integers from 0 to 2, c is an integer from 1 to 4 and the sum (a+b+c) is 4; $R_6$, $R_7$, and $R_8$, are alkyl, cycloalkyl or aryl radicals with 1-18 carbon atoms optionally containing heteroatoms. In some embodiments, the silicon compounds have a is 1, b is 1, c is 2, at least one of $R_6$ and $R_7$ is selected from branched alkyl, cycloalkyl or aryl groups with 3-10 carbon atoms optionally containing heteroatoms and $R_8$ is a $C_1$-$C_{10}$ alkyl group. In some embodiments, $R_8$ is a methyl. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)-(2-ethylpiperidinyl)-dimethoxysilane, and methyl(3,3,3-trifluoro-n-propyl)dimethoxysilane. In some embodiments, the silicon compounds have a is 0, c is 3, $R_7$ is a branched alkyl or cycloalkyl group, optionally containing heteroatoms, and $R_8$ is methyl. In some embodiments, the silicon compounds are selected from the group consisting of cyclohexyltrimethoxysilane, t-butyltrimethoxysilane and thexyltrimethoxysilane.

In some embodiments, the electron donor compound (iii) is used in such an amount to give a molar ratio between the organoaluminum compound and the electron donor compound (iii) of from about 0.1 to about 500, alternatively from about 1 to about 300, alternatively from about 3 to about 100.

In some embodiments, the polyolefin composition is obtained by blending components A) and B). In some embodiments, both components are obtained by polymerization processes in gas-phase operating in one or more fluidized or mechanically agitated bed reactors, slurry polymerization using as diluent an inert hydrocarbon solvent, or bulk polymerization using the liquid monomer as a reaction medium. In some embodiments, the liquid monomer is propylene. In some embodiments, the polyolefin composition is obtained with a polymerization process in two or more stages in which component A) is obtained in the first stages and then component B) is obtained in the second stages in the presence of component A). In some embodiments, each stage is in gas-phase, operating in one or more fluidized or mechanically agitated bed reactors, slurry phase using as diluent an inert hydrocarbon solvent, or bulk polymerization using the liquid monomer as a reaction medium. In some embodiments, the liquid monomer is propylene.

In some embodiments, the polymerization is carried out at temperature of from 20 to 120° C., alternatively from 40 to 80° C. In some embodiments, the polymerization is carried out in gas-phase with the operating pressure between about 0.5 and about 5 MPa, alternatively between about 1 and about 4 MPa. In some embodiments, the polymerization is carried out in bulk polymerization with the operating pressure between about 1 and about 8 MPa, alternatively between about 1.5 and about 5 MPa. In some embodiments, hydrogen is used as a molecular weight regulator.

The following examples are illustrative and are not intended to limit the scope of this disclosure in any way.

EXAMPLES

Characterizations

Determination of Mg, Ti

The determination of Mg and Ti content in the solid catalyst component was carried out via inductively coupled plasma emission spectroscopy on "I.C.P Spectrometer ARL Accuris".

The sample was prepared by analytically weighing, in a "Fluxy" platinum crucible", 0.1÷0.3 grams of catalyst and 2 grams of lithium metaborate/tetraborate 1/1 mixture. After addition of some drops of KI solution, the crucible was inserted in a "Claisse Fluxy" for the complete burning. The residue was collected with a 5% v/v $HNO_3$ solution and then analyzed via ICP at the following wavelengths: Magnesium, 279.08 nm; and Titanium, 368.52 nm.

Determination of Bi

The determination of Bi content in the solid catalyst component was carried out via inductively coupled plasma emission spectroscopy on "I.C.P Spectrometer ARL Accuris".

The sample was prepared by analytically weighing in a 200 $cm^3$ volumetric flask 0.1÷0.3 grams of catalyst. After slow addition of both about 10 milliliters of 65% v/v $HNO_3$ solution and about 50 $cm^3$ of distilled water, the sample underwent a digestion for 4÷6 hours. Then the volumetric flask was diluted to the mark with deionized water. The resulting solution was directly analyzed via ICP at the following wavelength: Bismuth, 223.06 nm.

Determination of Internal Donor Content

The determination of the content of internal donor in the solid catalytic compound was done through gas chromatography. The solid component was dissolved in acetone, an internal standard was added, and a sample of the organic phase was analyzed in a gas chromatograph, to determine the amount of donor present at the starting catalyst compound.

Determination of Xylene-Soluble Fraction 0/25° C.

2.5 g of polymer and 250 mL of o-xylene were introduced in a glass flask equipped with a refrigerator and a magnetic stirrer. The temperature was raised in 30 minutes up to the boiling point of the solvent. The solution was then kept under reflux and stirring for further 30 minutes. The closed flask was then kept for 30 minutes in a bath of ice and water then in thermostatic water bath at 25° C. for 30 minutes as well. The solid was filtered on quick filtering paper and 100 ml of the filtered liquid was poured in a pre-weighed aluminum container, which was then heated on a heating plate under nitrogen flow, to remove the solvent by evaporation. The container was then kept in an oven at 80° C. under vacuum until constant weight was obtained. The content of the xylene-soluble fraction is expressed as a percentage of the original 2.5 grams and then, by difference (complementary to 100), the X.I. %.

Molecular Weight Distribution (Mw/Mn)

Molecular weights and molecular weight distribution were measured at 150° C. using a Waters Alliance GPCV/2000 instrument equipped with four mixed-bed columns PLgel Olexis having a particle size of 13 μm. The dimensions of the columns were 300×7.8 mm. The mobile phase used was vacuum distilled 1,2,4-trichlorobenzene (TCB) and the flow rate was kept at 1.0 ml/min. The sample solution was prepared by heating the sample under stirring at 150° C. in TCB for one to two hours. The concentration was 1 mg/ml. To prevent degradation, 0.1 g/l of 2,6-di-tert-butyl-p-cresol were added. 300 μl (nominal value) of solution were injected into the column set. A calibration curve was obtained using 10 polystyrene standard samples (Easi-Cal kit by Agilent) with molecular weights in the range from 580 to 7 500 000. It was assumed that the K values of the Mark-Houwink relationship were:

$K=1.21\times10^{-4}$ dl/g and $\alpha=0.706$ for the polystyrene standards, $K=1.90\times10^{-4}$ dl/g and $\alpha=0.725$ for the experimental samples.

A third order polynomial fit was to interpolate the experimental data and obtain the calibration curve. Data acquisition and processing was done by using Waters Empowers 3 Chromatography Data Software with GPC option.

Melt Flow Rate (MFR)

The melt flow rate MFR of the polymer was determined according to ISO 1133 (230° C., 2.16 Kg).

Determination of the Comonomer Content:

The comonomers content was determined by infrared spectroscopy by collecting the IR spectrum of the sample vs. an air background with a Fourier Transform Infrared spectrometer (FTIR) the instrument data acquisition parameters were:

purge time: 30 seconds minimum
collect time: 3 minutes minimum
apodization: Happ-Genzel
resolution: 2 cm-1.

Sample Preparation:

Using a hydraulic press, a thick sheet was obtained by pressing about 1 g of sample between two aluminum foils.

When homogeneity was in question, a minimum of two pressing operations were performed. A small portion was cut from the sheet to mold a film. The film thickness was between 0.02-:0.05 cm (8-20 mils).

Pressing temperature was 180±10° C. (356° F.) and about 10 kg/cm2 (142.2 PSI) pressure for about one minute. The pressure was released and the sample was removed from the press and cooled to room temperature.

The spectrum of a pressed film of the polymer was recorded in absorbance vs. wavenumbers (cm-1). The following measurements were used to calculate ethylene and 1-butene content:

Area (At) of the combination absorption bands between 4482 and 3950 cm-1 which was used for spectrometric normalization of film thickness.

Area (AC2) of the absorption band between 750-700 cm-1 after two proper consecutive spectroscopic subtractions of an isotactic non additive polypropylene spectrum and then of a reference spectrum of an 1-butene-propylene random copolymer in the range 800-690 cm-1.

Height (DC4) of the absorption band at 769 cm-1 (maximum value), after two proper consecutive spectroscopic subtractions of an isotactic non additive polypropylene spectrum and then of a reference spectrum of an ethylene-propylene random copolymer in the range 800-690 cm-1.

To calculate the ethylene and 1-butene content calibration, straights lines for ethylene and 1-butene obtained from standards containing ethylene and 1-butene:

Calibration of Ethylene:

Calibration straight line was obtained by plotting AC2/At versus ethylene molar percent (% C2m). The slope GC2 was calculated from a linear regression.

Calibration of 1-Butene

A calibration straight line was obtained by plotting DC4/At versus butene molar percent (% C4m). The slope GC4 was calculated from a linear regression.

Spectrum of the sample was recorded and then (At), (AC2) and (DC4) of the sample were calculated. The ethylene content (% molar fraction C2m) of the sample was calculated as follows:

$$\% \, C2m = \frac{1}{G_{C2}} \cdot \frac{A_{C2}}{A_t}$$

The 1, butene content (% molar fraction C4m) of the sample was calculated as follows:

$$\% \, C4m = \frac{1}{G_{C4}} \cdot \left( \frac{A_{C4}}{A_t} - I_{C4} \right)$$

The propylene content (molar fraction C3m) was calculated as follows:

$C3m = 100 - \% \, C4m - \% \, C2m$

The ethylene and 1-butene contents by weight were calculated as follows:

$$\% \, C2wt = 100 \cdot \frac{28 \cdot C2m}{(56 \cdot C4m + 42 \cdot C3m + 28 \cdot C2m)}$$

$$\% \, C4wt = 100 \cdot \frac{56 \cdot C4m}{(56 \cdot C4m + 42 \cdot C3m + 28 \cdot C2m)}$$

The comonomer content of components A) and B) were measured by using the formulas:

$$C_{2tot}=X_A C_{2A}+X_B C_{2B} \text{ and } C_{4tot}=X_B C_{4B}$$

Wherein

C2 is the ethylene derived units wt % of component A, B or total ethylene content;

C4 is the 1-butene derived units wt % of component B or total 1-butene content $X_A$ is the amount of component AWt %/100

$X_B$ is the amount of component BWt %/100

Melting Temperature Via Differential Scanning Calorimetry (DSC)

The melting points of the polymers (Tm) were measured by Differential Scanning calorimetry (D.S.C.) on a Perkin Elmer DSC-1 calorimeter, previously calibrated against indium melting points, and according to ISO 11357-1, 2009 and 11357-3, 2011, at 20° C./min. The weight of the samples in DSC crucibles was kept at 6.0±0.5 mg.

To obtain the melting point, the weighed sample was sealed into aluminum pans and heated to 200° C. at 20° C./minute. The sample was kept at 200° C. for 2 minutes, then cooled to 5° C. at 20° C./minute. After standing 2 minutes at 5° C., the sample was heated for the second run time to 200° C. at 20° C./min. In this second heating run, the peak temperature (Tp,m) was taken as the melting temperature.

Determination of the Haze

An about 5×5 cm 50 µm thick film specimen was prepared by extruding each test composition in a single screw Collin extruder (length/diameter ratio of screw 1:25) at a film drawing speed of 7 m/min and a melt temperature of 210-250° C. The haze value was measured using a Gardner photometric unit connected to a Hazemeter type UX-10 or an equivalent instrument having G.E. 1209 light source with filter "C". Reference specimen were used for calibrating the instrument.

Seal Initiation Temperature (SIT)

Preparation of the Film Specimens

Films with a thickness of 50 µm were prepared by extruding each test composition in a single screw Collin extruder (length/diameter ratio of screw 1:25) at a film drawing speed of 7 m/min and a melt temperature of 210-250° C. Each resulting film was superimposed on a 1000 µm thick film of a propylene homopolymer having a xylene insoluble fraction of 97 wt % and a MFR L of 2 g/10 min. The superimposed films were bonded to each other in a Carver press at 200° C. under a 9000 kg load, which was maintained for 5 minutes. The resulting laminates were stretched longitudinally and transversally (that is, biaxially) by a factor 6 with a T.M. Long film stretcher at 150° C., thus obtaining a 20 µm thick film (18 µm homopolymer+2 µm test). 2×5 cm specimens were cut from the films.

Determination of the SIT.

For each test, two of the specimens were superimposed in alignment, the adjacent layers being layers of the particular test composition. The superimposed specimens were sealed along one of the 2 cm sides with a Brugger Feinmechanik Sealer, model HSG-ETK 745. Sealing time was 5 seconds at a pressure of 0.1 N/mm². The sealing temperature was increased 1° C. for each seal, starting from about 30° C. less than the melting temperature of the test composition. The sealed samples were left to cool and then the unsealed ends were attached to an Instron machine where the samples were tested at a traction speed of 50 mm/min.

The SIT was the minimum sealing temperature at which the seal did not break when a load of at least 2 Newtons was applied in the test conditions.

Creep and Recovery Test

Creep and recovery curves were measured by using a Physica MCR301 rheometer having a cone plate geometry of 25 mm of radius and an angle of measuring cone of 1.992° grades with the cone plate on the top. The temperature of the tests was 200° C.

Determination of the Creep Time.

The complex viscosity was determined in a frequency sweep test from 100 rad/s to 0.01 rad/s at constant strain of 5% and the value at frequency of 0.01 rad/s was used to calculate the creep time (no time setting in the profile). The creep time was then calculated by using the formula:

$$\text{Creep time}=\text{complex viscosity}_{@0.01 rad/s}/100; \qquad [1]$$

Wherein 100 was the applied stress in Pascal

Determination of Recovery Time

The recovery time was calculated according to the following formula:

$$\text{Recovery time}=\text{Creep time}*7 \qquad [2]$$

Creep and Recovery Test a) Creep

The creep was measured once a second for a maximum seconds according to the creep time calculated in [1]. The shear stress applied was 100 Pa;

b) Recovery

The recovery was measured once a second for a maximum seconds according to the recovery time calculated in [2] The shear stress applied was 0 Pa;

At the end of the test, the software calculated the curve s vs Pa.

Polymerization Examples 1 and 2

Procedure for the Preparation of the Spherical Adduct

Microspheroidal $MgCl_2 \cdot pC_2H_5OH$ adduct was prepared according to the method described in Comparative Example 5 of Patent Cooperation Treaty Publication No. WO98/44009, incorporated herein by reference, with the difference that $BiCl_3$ in a powder form and in the amount of 3 mol % with respect to the magnesium being added before feeding the oil. The adduct contained 11.2 wt % of Mg, based upon the total weight of the adduct.

Procedure for the Preparation of the Solid Catalyst Component

Into a 300 L jacketed reactor, equipped with mechanical stirrer, condenser and thermocouple, 200 L of $TiCl_4$ were introduced at room temperature under nitrogen atmosphere. After cooling to 0° C., while stirring, diisobutylphthalate and 8 kg of the spherical adduct were sequentially added. The amount of charged internal donor was such to meet a Mg/donor molar ratio of 8. The temperature was raised to 100° C. and maintained for 1 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at 120° C. and kept at this temperature for ½ hour. Stirring was stopped again, the solid was allowed to settle and the supernatant liquid was siphoned off at 120° C. The treatment with $TiCl_4$ at 120° C. was then repeated again but the treatment time was decreased to 15 minutes. The solid was washed with anhydrous hexane six times in temperature gradient down to 60° C. and one time at room temperature. The solid was then dried under vacuum.

Prepolymerization Treatment

Before introducing the solid catalyst component into the polymerization reactors, the solid catalyst component was contacted with triethyl aluminum (TEAL) and Dicyclopentyldimethoxysilane (DCPMS, D donor) in a ratio reported in Table 1. Then the resulting mixture was subjected to pre-polymerization by maintaining the mixture in suspension in liquid propylene at 20° C. for about 5 minutes before introducing the mixture into the polymerization reactor.

Polymerization

Into a first gas phase polymerization reactor a propylene ethylene copolymer was produced by feeding in a continuous and constant flow the prepolymerized catalyst system, hydrogen (when used as a molecular weight regulator), propylene, and ethylene, in the gas state.

The polymer produced in the first reactor was discharged in a continuous flow and, after having been purged of unreacted monomers, was introduced, in a continuous flow, into a second gas phase polymerization reactor, together with quantitatively constant flows of hydrogen (when used) 1-butene, ethylene and propylene, in the gas state.

The polymer particles exiting the second reactor were subjected to a steam treatment to remove the reactive monomers and volatile substances, and then dried.

The main polymerization conditions are reported in Table 1. The polymer features are reported in Table 2

TABLE 1

|  |  | ex1 | ex 2 |
|---|---|---|---|
| catalyst feed | g/h | 10 | 10 |
| TEAL/solid catalyst component weight ratio | g/g | 4.2 | 3.9 |
| TEAL/D donor weight ratio | g/g | 3.9 | 4.3 |
| First gas phase reactor |  |  |  |
| Polymerisation temperature | ° C. | 70 | 70 |
| Pressure | barg | 18.0 | 18.1 |
| H2/C3 | mol/mol | 0.065 | 0.032 |
| C2/C2 + C3 | mol/mol | 0.040 | 0.096 |
| split first reactor (amount A) | wt % | 34 | 35 |
| Second gas phase reactor |  |  |  |
| Polymerisation temperature | ° C. | 70 | 75 |
| Pressure | barg | 16.0 | 16.0 |
| MFR* | g/10 min | 5.2 | 6.7 |
| H2/C3 | mol/mol | 0.163 | 0.072 |
| C2/C2 + C3 | mol/mol | 0.042 | 0.065 |
| C4/C4 + C3 | mol/mol | 0.130 | 0.138 |
| split second reactor (amount B) | wt % | 66 | 65 |

C2 = ethylene;
C3 = propylene;
C4 = 1-butene; H2 = hydrogen
*total MFR of component A) + component B)

TABLE 2

|  |  | ex 1 | ex2 | comp ex 3 |
|---|---|---|---|---|
| split component A) | wt % | 34 | 35 | 35 |
| C2-% content of component A | wt % | 3.3 | 3.5 | 3.3 |
| MFR (total) | g/10 min | 5.2 | 6.7 | 5.5 |
| C2% content (total) | wt % | 3.4 | 3.0 | 3.2 |
| C4% content (total) | wt % | 6.1 | 5.7 | 5.9 |
| Xylene Soluble 0°/25° (XS) | wt % | 9.7 | 6.3 | 8.7 |
| Mw/Mn |  | 5.0 | 5.2 | 6.0 |
| Tm | ° C. | 130.4. | 131.1 | 130.5 |
| SIT | ° C. | 98 | 104 | 105 |
| Haze | % | 0.12 | 0.10 | 0.20 |

TABLE 2-continued

|  |  | ex 1 | ex2 | comp ex 3 |
|---|---|---|---|---|
| Maximum recoverable compliance between 800 and 1200 s | 1/Pa | 35 $10^{-5}$ | 50 $10^{-5}$ | 78 $10^{-5}$ |
| 114-(XSx1.3) |  | 101 | 106 | 103 |

C2 = ethylene;
C3 = propylene;
C4 = 1-butene

Comparative example 1 was a commercial product sold by LyondellBasell having the features reported in Table 2 and being produced by using a catalyst equal to Example 1 or Example 2, excluding bismuth.

Multilayer Film

The polymers of Examples 1 and 2 and comparative example 1 were used to produce a A/B/A multilayer film wherein the A layer are the polymers of the examples and the B layer is a propylene homopolymer MOPLEN HP515M sold by LyondellBasell. Processing parameters are reported in Table 3.

TABLE 3

|  |  | Layer thickness μm | Melt temperature ° C. | Line speed m/min |
|---|---|---|---|---|
| Layer A | Internal sealing later | 1 | 244 | 36 |
| Layer B | Core | 28 | 263 |  |
| Layer A | Outside layer | 1 | 244 |  |

The multilayer films were stretched longitudinally with a ratio 5.1:1 and transversally with a ratio 9.1:1.

Sample of the films were subjected to a corona treatment and then the surface tension was measured after the days reported in Table 4.

TABLE 4

| surface tension days | Ex | 1 | 2 | comp ex 3 |
|---|---|---|---|---|
| 1 | dyne/cm | 48 | 47 | 47 |
| 7 | dyne/cm | 46 | 46 | 45 |
| 14 | dyne/cm | 45 | 45 | 44 |
| 21 | dyne/cm | 45 | 45 | 42 |
| 28 | dyne/cm | 44 | 44 | 42 |

What is claimed is:

1. A multilayer film comprising:
   (i) a skin layer comprising
      (a) a polyolefin composition comprising:
         A) from about 19 wt % to about 50 wt %, based upon the total weight of the polyolefin composition, of a propylene ethylene copolymer having an ethylene derived units content ranging from about 1.5 wt % to about 6.0 wt %, based upon the total weight of the propylene ethylene copolymer and
         B) from about 50 wt % to about 81 wt %, based upon the total weight of the polyolefin composition, of a propylene ethylene 1-butene terpolymer having an ethylene derived units content ranging from about 1.5 wt % to about 6.0 wt %, based upon the total weight of the propylene ethylene 1-butene terpolymer, and 1-butene derived units content of between about 4.8 wt % and about 12.4 wt %, based upon the total weight of the propylene ethylene 1-butene terpolymer;

the sum of the amount of component A) and B) being 100;

the composition being characterized by the following features:

molecular weight distribution (MWD), expressed in terms of Mw/Mn, greater than about 4.0;

a xylene soluble fraction content at 0/25° C. is between 1.2 and 15.1 wt. %, based on the total weight of the polyolefin composition; and the creep and recovery curve measured on the polymer fuse at 200° C. measured shows a maximum value between 600 and 1200 seconds, lower than about $53 \times 10^{-4}$ 1/Pa;

wherein the polyolefin composition is made in the presence of a catalyst made from or containing the product of the reaction between:

(i) a solid catalyst component made from or containing Ti, Mg, Cl and an electron donor compound, containing 0.1 to 50 wt. % of Bi, based upon the total weight of the solid catalyst component;

(ii) an alkylaluminum compound, and (iii) an external electron-donor compound.

2. The multilayer film according to claim 1, wherein in the polyolefin composition component A) ranges from about 25 wt % to about 42 wt %, based upon the total weight of the polyolefin composition, and component B) ranges from about 58 wt % to about 75 wt %, based upon the total weight of the polyolefin composition.

3. The multilayer film according to claim 1, wherein the polyolefin composition the ethylene derived units content in component A) ranges from about 2.6 wt % to about 5.2 wt %, based upon the total weight of the propylene ethylene copolymer.

4. The multilayer film according to claim 1, wherein in the polyolefin composition the ethylene derived units content in component B) ranges from about 1.9 wt % to about 4.8 wt %, based upon the total weight of the propylene ethylene 1-butene terpolymer; and the 1-butene derived units content ranges from about 5.1 wt % to about 10.3 wt %, based upon the total weight of the propylene ethylene 1-butene terpolymer.

5. The multilayer film according to claim 1, wherein in the polyolefin composition the creep and recovery curve measured on the polymer fuse at 200° C. shows a maximum value between 600 and 1200 seconds, lower than about $51 \times 10^{-5}$ 1/Pa.

6. The multilayer film according to claim 1, wherein in the polyolefin composition the ethylene derived units content ranges from about 1.5 wt % to about 6.0 wt %, based upon the total weight of the polyolefin composition.

7. The multilayer film according to claim 1 wherein in the polyolefin composition the 1-butene derived units content ranges from about 3.2 wt % to about 9.8 wt %, based upon the total weight of the polyolefin composition.

8. The multilayer film according to claim 1 having from 3 to 11 layers.

9. The multilayer film according to claim 1 having from 3 to 9 layers.

10. The multilayer film according to claim 1 having from 3 to 7 layers.

11. The multilayer film according to claim 1 having 3 or 5 layers.

12. The multilayer film according to claim 1 having an A/B/A or A/B/C structure and the A-layer as the skin layer.

* * * * *

UNITED STATES PATENT AND TRADEMARK OFFICE
CERTIFICATE OF CORRECTION

PATENT NO. : 11,028,259 B2
APPLICATION NO. : 15/750799
DATED : June 8, 2021
INVENTOR(S) : Massari et al.

Page 1 of 1

It is certified that error appears in the above-identified patent and that said Letters Patent is hereby corrected as shown below:

On the Title Page

Column 1, Item (30), Line 1, delete "15180036" and insert -- 15180036.4 --, therefor Signed and Sealed this
Twenty-fourth Day of January, 2023

Katherine Kelly Vidal
*Director of the United States Patent and Trademark Office*